(12) United States Patent
Park (10) Patent No.: US 7,670,399 B2
(45) Date of Patent: Mar. 2, 2010

(54) EXHAUST PIPE HAVING TURBULENCE WINGS AND AN EXHAUST SYSTEM

(75) Inventor: Tea-Jin Park, Gyeonggi-do (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 629 days.

(21) Appl. No.: 11/623,289

(22) Filed: Jan. 15, 2007

(65) Prior Publication Data

US 2008/0041448 A1    Feb. 21, 2008

(30) Foreign Application Priority Data

Aug. 16, 2006    (KR) ..................... 10-2006-0077247

(51) Int. Cl.
*B01D 50/00*    (2006.01)
(52) U.S. Cl. .................... 55/385.2; 137/3; 118/715; 438/765
(58) Field of Classification Search .............. 55/385.2; 137/3; 118/715; 438/765
See application file for complete search history.

(56) References Cited

U.S. PATENT DOCUMENTS 6,171,104 B1 * 1/2001 Saito et al. .................... 432/18
2003/0136365 A1   7/2003 Komai et al.

FOREIGN PATENT DOCUMENTS

| JP | 3-10077 | 1/1991 |
|---|---|---|
| JP | 09-074091 | 3/1997 |
| JP | 2001-126988 | 5/2001 |
| JP | 2003-068657 | 3/2003 |
| KR | 2003-0053283 | 6/2003 |

OTHER PUBLICATIONS

English language abstract of Korean Publication No. 2003-0053283, Jun. 28, 2003.
English language abstract of Japanese Publication No. 09-074091, Mar. 18, 1997.
English language abstract of Japanese Publication No. 2003-068657, Mar. 7, 2003.

* cited by examiner

*Primary Examiner*—Robert A Hopkins
(74) *Attorney, Agent, or Firm*—Volentine & Whitt, PLLC (57) ABSTRACT

Provided are an exhaust pipe having turbulence wings, and an exhaust system. The exhaust pipe includes an outer pipe and an inner pipe. The exhaust pipe is connected to a scrubber of the exhaust system. The outer pipe has a gas inlet port. The inner pipe is installed in the outer pipe. A gap exists between the outer pipe and the inner pipe. The inner pipe includes a plurality of turbulence wings and gas discharge ports. The gas discharge ports are in communication with the gas inlet port via the gap. The turbulence wings project inward from the inner pipe and are disposed adjacent to the gas discharge ports. The inner pipe has an exhaust gas passage formed therein. When a gas is flowed through the gas discharge ports and over the turbulence wings, a jet layer is formed adjacent to an interior sidewall of the inner pipe. The jet layer forms a buffer between the exhaust gas passage and the inner pipe sidewalls. In this way, exhaust gases passing through the exhaust gas passage are prevented from contacting the inner pipe surface. Absorption of exhaust gas byproducts at the surface of the exhaust pipe is therefore reduced.

30 Claims, 10 Drawing Sheets

EXHAUST PIPE HAVING TURBULENCE WINGS AND AN EXHAUST SYSTEM

This application claims the benefit of Korean Patent Application No. 2006-0077247, filed Aug. 16, 2006, the contents of which are hereby incorporated herein by reference in their entirety.

BACKGROUND OF THE INVENTION

1. Field of the Invention

The present invention relates to an exhaust pipe, and more particularly, to an exhaust pipe having turbulence wings and an exhaust system.

2. Description of Related Art

A process chamber uses various kinds of chemical materials such as a process gas while manufacturing a semiconductor device or a flat panel display. Byproducts and residual gases produced from the process chamber are transferred to a scrubber using a discharge apparatus such as a vacuum pump. The scrubber functions to purge/separate the byproducts and residual gases, and then discharge them.

The process chamber, the vacuum pump, and the scrubber are interconnected using exhaust pipes. That is, the exhaust pipes function as passages through which the byproducts and the residual gases move. Therefore, the exhaust pipes should have transport capacity sufficient to discharge the byproducts and residual gases.

A noted problem with exhaust pipes is the possibility of byproducts being adsorbed on inner surfaces of the exhaust pipes and therefore reducing the effectiveness of the byproduct exhaust system. The adsorption of the byproducts rapidly decreases the transport capacity of the exhaust pipes. In addition, the adsorption of the byproducts may cause various problems such as clogging of the exhaust pipes and malfunction of the vacuum pump, thereby shortening a maintenance cycle of the exhaust pipes. With the downtime required to clean these clogged exhaust pipes, the effective operating rate of the process chamber decreases.

Accordingly, the need exists for a method and device operable to reduce the deposition and/or absorption of byproducts and residual gases on exhaust pipes of the type used with processing chambers.

SUMMARY OF THE INVENTION

In one aspect, the invention is directed to an exhaust pipe having turbulence wings. The exhaust pipe includes an outer pipe and an inner pipe. The outer pipe has a gas inlet port. The inner pipe is installed in the outer pipe. The inner pipe includes a plurality of turbulence wings and gas discharge ports. The turbulence wings project inward from the inner pipe and are disposed adjacent to the gas discharge ports. The inner pipe has an exhaust gas passage formed therein. A gap exists between the outer pipe and the inner pipe. The gas discharge ports are in communication with the gas inlet port via the gap.

In some embodiments of the present invention, the turbulence wings may be spaced apart from each other and arranged spirally along an inner periphery of the inner pipe. In addition, the turbulence wings may be arranged annularly along an inner periphery of the inner pipe.

In other embodiments, the turbulence wings may have the same thickness as the inner pipe. The turbulence wings may be formed by a sheet metal forming process. An angle of intersection between the turbulence wings and the inner pipe may range from 1 to 179°.

In still other embodiments, the turbulence wings may be disposed at an inlet side, an outlet side, or both sides of the exhaust gas passage about the first gas discharge port.

In yet other embodiments, a second gas discharge port spaced apart from the first gas discharge port may be disposed on the inner pipe. The second gas discharge port may be alternately arranged with, or offset from, the turbulence wings.

In another aspect, the present invention is directed to an exhaust system. The system includes an outer pipe having a gas inlet port. The outer pipe is connected to a scrubber at its one end, and to a process chamber at the other end. An inner pipe is installed in the outer pipe. The inner pipe includes a plurality of turbulence wings and gas discharge ports. The turbulence wings project inward from the inner pipe and are disposed adjacent to the gas discharge ports. The inner pipe provides an exhaust gas passage therein. A gap exists between the outer pipe and the inner pipe. The gas discharge ports are in communication with the gas inlet port via the gap.

In some embodiments of the present invention, a vacuum pump may be disposed between the process chamber and the outer pipe.

In other embodiments, the turbulence wings may be spaced apart from each other and arranged spirally along an inner periphery of the inner pipe. In addition, the turbulence wings may be arranged annularly along an inner periphery of the inner pipe.

In still other embodiments, a second gas discharge port may be disposed on the inner pipe and spaced apart from the First gas discharge port.

In yet other embodiments, the gas inlet port may be connected to an inert gas supplier. The inert gas supplier may include a heat generating apparatus for supplying a heated inert gas. The heated inert gas may have a temperature of 20~300° C.

In still another aspect, the present invention is directed to an exhaust method. The method includes connecting a scrubber to one end of an exhaust pipe. The exhaust pipe includes an outer pipe, and an inner pipe installed in the outer pipe. The outer pipe includes a gas inlet port formed on its sidewall. The inner pipe includes a plurality of turbulence wings and gas discharge ports. A gap exists between the outer pipe and the inner pipe. The gas inlet port is in communication with the gas discharge ports via the gap. An inert gas is supplied into the gas inlet port to form a jet layer of the inert gas in the inner pipe. A process chamber is connected to the other end of the exhaust pipe. Byproducts and residual gases produced in the process chamber are transported to the scrubber via an exhaust gas passage formed in the exhaust pipe.

In some embodiments of the present invention, the turbulence wings may be spaced apart from each other, project inward from the inner pipe, and be arranged spirally along an inner periphery of the inner pipe.

In other embodiments, a vacuum pump may be disposed between the process chamber and the exhaust pipe.

In still other embodiments, the gas inlet port may be connected to an inert gas supplier. The inert gas may be a gas heated to a temperature of 20~300° C.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

DETAILED DESCRIPTION OF THE INVENTION

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like reference numerals designate like elements throughout the specification.

Figure 1:
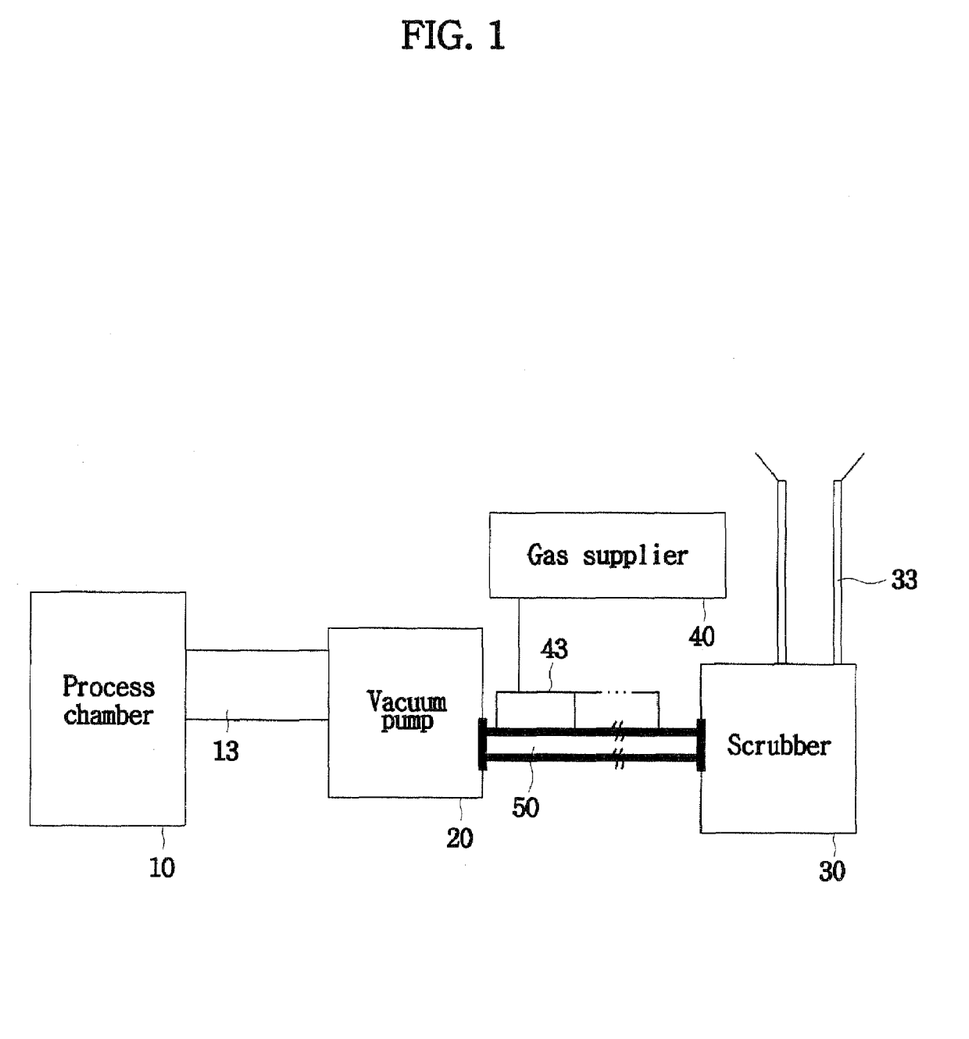
FIG. 1 is a block diagram showing an exhaust system having an exhaust pipe in accordance with an exemplary embodiment of the present invention.

FIG. 1 is a block diagram of an exhaust system having an exhaust pipe in accordance with an exemplary embodiment of the present invention.

Referring to FIG. 1, the exhaust system in accordance with an exemplary embodiment of the present invention may include a process chamber 10, a vacuum pump 20, and a scrubber 30.

The process chamber 10 may be employed in an annealing apparatus, a thin layer deposition apparatus, or an etching apparatus, which is used for manufacturing a semiconductor device and a flat panel display. The process chamber 10 may have process gas pipes (not shown) for injecting process gases, which are omitted for the convenience of description.

A vacuum pipe 13 may be connected between the process chamber 10 and the vacuum pump 20. The vacuum pipe 13 may have a diameter of 130~300 mm. For example, the vacuum pipe 13 may be a stainless steel pipe having a diameter of 150 mm.

An exhaust pipe 50 may be connected between the vacuum pump 20 and the scrubber 30. The exhaust pipe 50 may have a diameter of 30~140 mm. For example, the exhaust pipe 50 may be a stainless steel pipe having a diameter of 50 mm.

The vacuum pump 20 may function to transport byproducts and residual gases in the process chamber 10 to the scrubber 30 through the vacuum pipe 13 and the exhaust pipe 50. That is, the vacuum pump 20 may function to discharge the byproducts and residual gases in the process chamber 10. In another exemplary embodiment, the vacuum pump 20 may be installed in the scrubber 30.

A purge gas exhaust pipe 33 may be connected to the scrubber 30. The scrubber 30 may function to purge/separate the byproducts and residual gases and then discharge them through the purge gas exhaust pipe 33.

The exhaust pipe 50 may be connected to an inert gas supplier 40 through a gas supply pipe 43. The inert gas supplier 40 may be an apparatus for supplying an inert gas such as nitrogen ($N_2$). In addition, the inert gas supplier 40 may include a heat generating apparatus (not shown) for heating the inert gas. The heat generating apparatus may be a heater for heating the inert gas to a temperature of 20~300° C. For example, the inert gas supplied into the exhaust pipe 50 from the inert gas supplier 40 may be the nitrogen ($N_2$) gas heated to 250° C.

Figure 2:
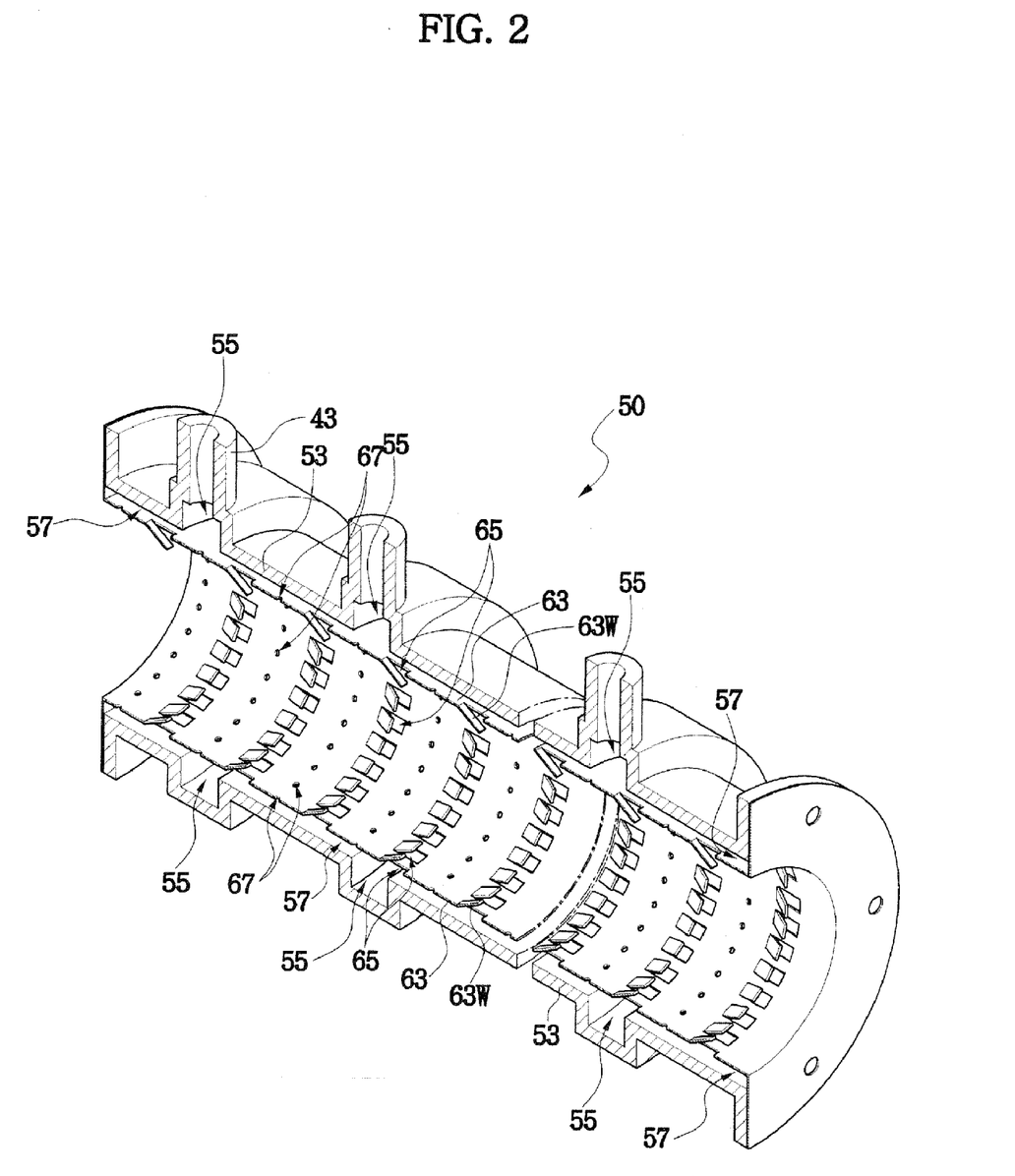
FIG. 2 is a partial perspective view of an exhaust pipe having turbulence wings in accordance with an exemplary embodiment of the present invention.
Figure 3:
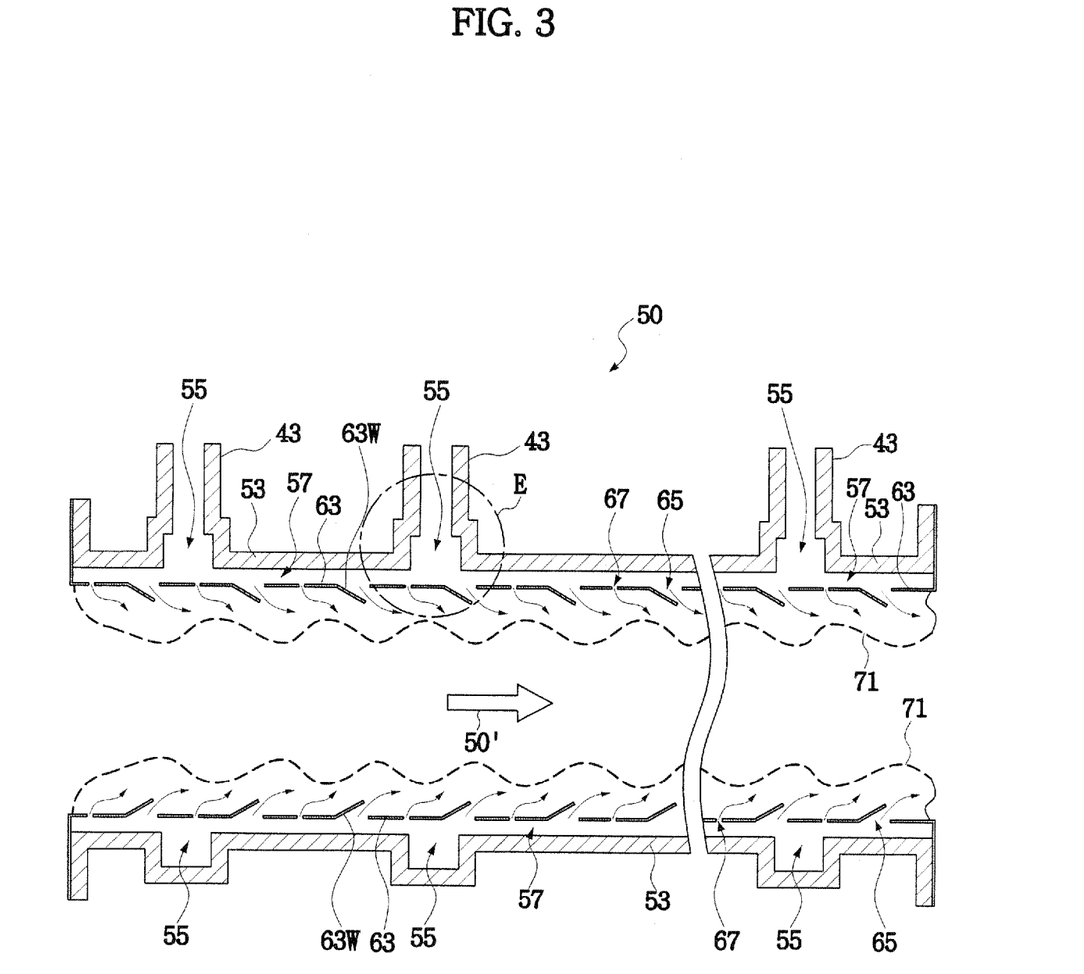
FIG. 3 is a cross-sectional view taken along the longitudinal axial line of the exhaust pipe of FIG. 2.

FIG. 2 is a partial perspective view of an exhaust pipe having turbulence wings in accordance with a first exemplary embodiment of the present invention, and FIG. 3 is a cross-sectional view taken along the longitudinal axial line of the exhaust pipe of FIG. 2.

Referring to FIGS. 2 and 3, the exhaust pipe 50 in accordance with a first exemplary embodiment of the present invention may include an outer pipe 53 and an inner pipe 63. The inner pipe 63 may be installed or nested in the outer pipe 53. A gap may be disposed between the outer pipe 53 and the inner pipe 63. She inner pipe 63 may include turbulence wings 63W that project into an interior of the inner pipe.

The outer pipe 53 may include a plurality of gas inlet ports 55 disposed at its periphery. The gas inlet port 55 may be in communication with a gas supply pipe 43. In addition, the gas inlet port 55 may be in communication with the gap 57 through a sidewall of the outer pipe 53.

The inner pipe 63 may include first gas discharge ports 65 and second gas discharge ports 67 that pass through sidewalls of the inner pipe. The first gas discharge ports 65 may be disposed along an inner periphery of the inner pipe 63 in an annular shape. The second gas discharge ports 67 may also be disposed along the inner periphery of the inner pipe 63 in an annular shape. The first gas discharge ports 65 and the second gas discharge ports 67 may be arranged in parallel to each other. The first gas discharge ports 65 and the second gas discharge ports 67 may be aligned in a line when seen from a longitudinal direction of the exhaust pipe 50. The first gas discharge ports 65 and the second gas discharge ports 67 may be in communication with the gas supply pipe 43 via the gap 57 and the gas inlet port 55.

The turbulence wings 63W may be disposed to project inward from the inner pipe 63. An exhaust gas passage 50' may be disposed in the inner pipe 63 passing from an upstream end (at the left in FIG. 3) closest to the process chamber 10 to a downstream end (at the right in FIG. 3) within the inner pipe 63 closest to the scrubber 30. The turbulence wings 63W may be disposed adjacent to the first gas discharge ports 65. In this case, the turbulence wing 63W may be disposed at an inlet side of the exhaust gas passage 50' about the first gas discharge port 65. That is, the turbulence wing 63W depends inward into the inner pipe 63 starting from an upstream end of the perforation in the inner pipe 63 forming the respective first gas discharge port 65. The turbulence wing 63W implemented as shown in FIG. 3 preferably angles inward toward a downstream end of the inner pipe 63. When the first gas discharge ports 65 are arranged annularly along an inner periphery of the inner pipe 63, the turbulence wings 63W may also be arranged annularly along the inner periphery of the inner pipe 63.

The outer pipe 53 should have strength and durability sufficient to prevent leakage of byproducts and residual gases discharged through the exhaust gas passage 50'. For example, the outer pipe 53 may be a stainless steel pipe. The inner pipe 63 may be formed of a material thinner than the outer pipe 53. For example, the inner pipe 63 may be a stainless steel pipe having a smaller thickness than the outer pipe 53.

Figure 4:
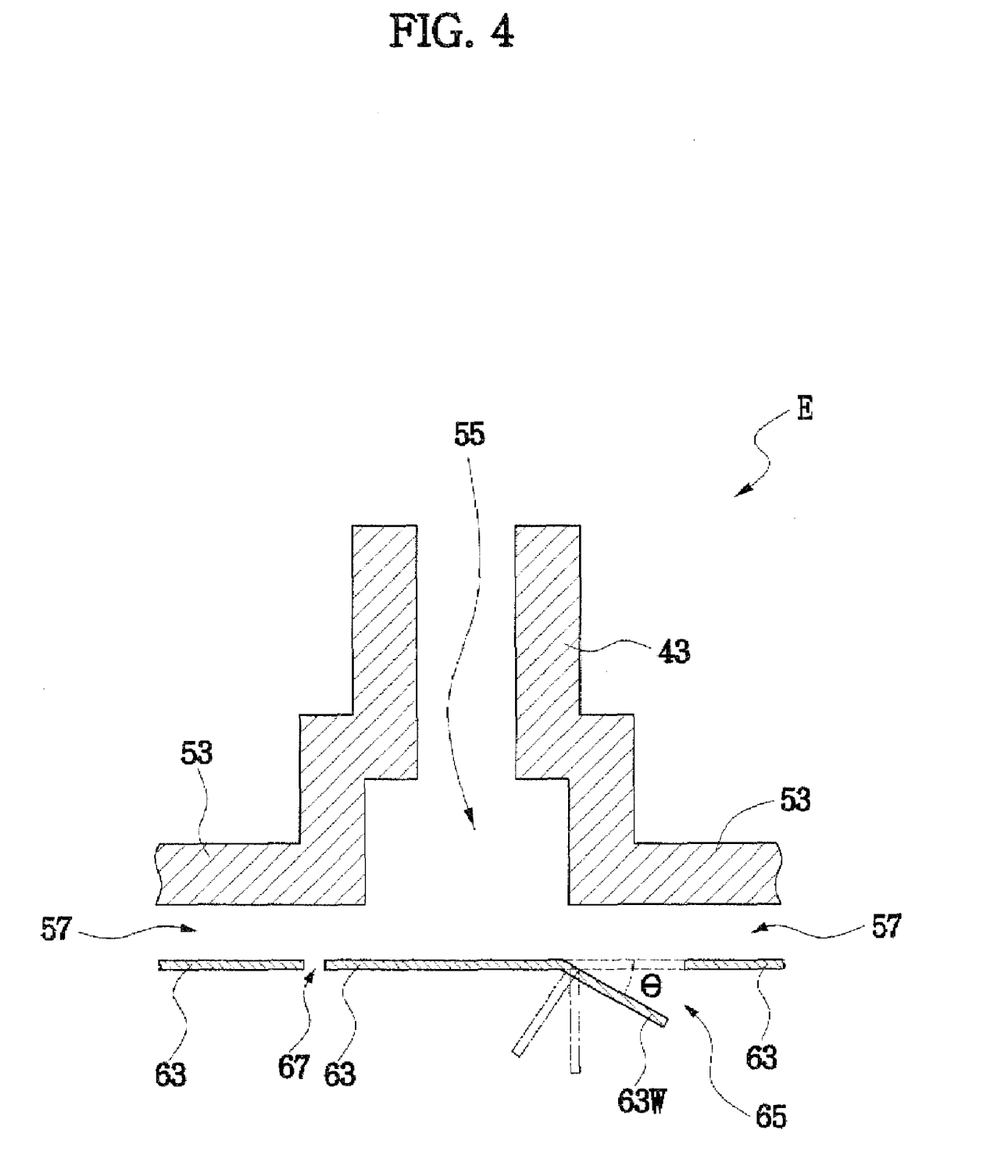
FIG. 4 is an enlarged cross-sectional view showing an E-part of FIG. 3.

FIG. 4 is an enlarged cross-sectional view showing a portion E of FIG. 3 for explaining an exhaust pipe having turbulence wings in accordance with a first exemplary embodiment of the present invention.

Referring to FIG. 4, the turbulence wings 63W may be disposed in various angles and configurations with respect to the inner pipe 63. An angle of intersection θ between the turbulence angle 63W and the inner pipe 63 may range from 1 to 179°. In addition, the turbulence wings 63W may be formed by a sheet metal forming process. Further, the turbulence wings 63W may have the same thickness as the inner pipe 63. Furthermore, the turbulence wing 63W may have a multi-bent shape (see, e.g., FIG. 9).

Hereinafter, operation of an exhaust system having an exhaust pipe in accordance with a first exemplary embodiment of the present invention will be described with reference to FIGS. 1 to 4.

Referring again to FIGS. 1 to 4, the inert gas supplier 40 may supply an inert gas such as nitrogen ($N_2$) gas through the gas supply pipe 43. The inert gas may be injected into the inner pipe 63 from the first gas discharge ports 65 and the second gas discharge ports 67 via the gas inlet port 55 and the gap 57. The inert gas injected from the first gas discharge ports 65 and the second gas discharge ports 67 may form a jet layer 71 (see FIG. 3) along the inner surface of the inner pipe 63.

Meanwhile, various chemical materials such as process gases may be injected into the process chamber 10. As a result, process byproducts such as reactive byproducts and residual gases may be produced in the process chamber 10. The process byproducts and the residual gases may be transported to the scrubber 30 using the vacuum pump 20. The scrubber 30 may purge/separate the process byproducts and the residual gases, and then discharge them through the purge gas exhaust pipe 33. In this process, the exhaust pipe 50 may be disposed between the vacuum pump 20 and the scrubber 30 to function as a passage through which the process byproducts and the residual gases are transported.

The exhaust pipe 50 may include the outer pipe 53, and the inner pipe 63 installed in the outer pipe 53. The inner pipe 63 may include the exhaust gas passage 50' formed therein. The process byproducts and the residual gases may be transported to the scrubber 30 via the exhaust gas passage 50'.

When the process byproducts and the residual gas are in contact with an inner wall of the exhaust pipe 50, an adsorption layer of the process byproducts and the residual gases may be formed on the inner wall of the exhaust pipe 50. The adsorption layer of the process byproducts and the residual gases may remarkably decrease transport capacity of the exhaust pipe 50. However, in accordance with a first exemplary embodiment of the present invention, the jet layer 71 forms a buffer that may function to prevent the process byproducts and the residual gases from being in contact with the inner wall of the exhaust pipe 50. Therefore, it is possible to prevent an adsorption layer of the process byproducts and the residual gases from being formed on the inner wall of the exhaust pipe 50.

In this case, the jet layer 71 is preferably formed to densely cover the inner wall of the exhaust pipe 50 to prevent the process byproducts and the residual gases from being in contact with the exhaust pipe 50. The turbulence wings 63W projecting inward from the inner pipe 63 may function to control flow of the inert gas. That is, it is possible to control the thickness and distribution of the jet layer 71 depending on disposition and configuration of the turbulence wings 63W. Therefore, it is possible to form the dense jet layer 71 using only a small amount of inert gas. The use of turbulence wings, such as those shown in the present embodiments, provide a distinct advantage over exhaust pipes having only pore-based injection such as exists in U.S. Patent Publication No. 2003/0136365A1 (Komai, et al.).

Flow velocity, direction, and thickness of the jet layer 71 may affect the transport capacity of the exhaust pipe 50. Sizes, shapes, and dispositions of the turbulence wings 63W, the first gas discharge ports 65, and the second gas discharge ports 67 may be adjusted to control the jet layer 71. The turbulence wings 63W may generate a swirl in the jet layer 71. The swirl of the jet layer 71 may increase a discharge speed of the process byproducts and residual gas, thereby remarkably increasing transport capacity of the exhaust pipe 50 and relatively reducing adsorption of the process byproducts.

The turbulence wings 63W may be arranged annularly or spirally along the inner periphery of the inner pipe 63. The turbulence wings 63W may be formed to have various sizes and shapes using sheet metal forming technology. For example, the turbulence wings 63W may be formed to have various shapes such as folding, dual bending, fan shapes, and a mixture thereof.

The turbulence wings 63W, the first gas discharge ports 65, and the second gas discharge ports 67 may be aligned in a line about a longitudinal axis of the exhaust pipe 50, and may be alternately disposed to or offset from each other.

While the process byproducts and residual gases produced in the process chamber 10 may be heated to a high temperature, such materials may cool while passing through the exhaust gas passage 50'. If the process byproducts and the residual gases have a phase transformation point, they may transform from a gaseous state to a solid state while passing through the exhaust gas passage. This transformation is undesired. When the process byproducts and the residual gases are cooled under the phase transformation point, the process byproducts and the residual gases may be lumped into masses. The masses of the process byproducts and the residual gases may be readily adsorbed to the inner wall of the exhaust pipe 50.

In accordance with a first exemplary embodiment of the present invention, the inert gas supplier 40 may supply the inert gas heated to a temperature of 20~300° C. In this case, the jet layer 71 may be formed of the heated inert gas. Therefore, the process byproducts and the residual gases may be transported while maintaining a temperature higher than the phase transformation point. That is, when the inert gas supplier 40 supplies the heated inert gas (e.g. nitrogen ($N_2$) gas), it is possible to effectively prevent adsorption of the process byproducts and residual gases to the inner wall of the exhaust pipe 50.

For example, there may be a process byproduct having a phase transformation point of 200° C. among the process byproducts. In this case, when the process byproducts are cooled to a temperature lower than 200° C., the byproducts may be transformed to a state that can be readily adsorbed to the inner wall of the exhaust pipe 50. However, when the inert gas supplier 40 supplies the inert gas heated to 250° C., it is possible to effectively prevent adsorption of the process byproducts.

More specifically, the jet layer 71 may be formed of the inert gas heated to 250° C. In this case, the jet layer 71 may function to prevent the process byproducts and the residual gases from being in contact with the inner wall of the exhaust pipe 50, and maintain the process byproducts and the residual gases at a temperature higher than the phase transformation point. Therefore, the process byproducts and the residual gases may be readily discharged through the exhaust gas passage 50' while maintaining a gaseous state.

Further, the inert gas heated to 250° C. may function to heat the interior of the exhaust pipe 50. In this case, the inert gas may function to remove the adsorption layer of the process byproducts, which may be previously attached to the inner wall of the exhaust pipe 50.

As described above, it is possible to effectively prevent adsorption of the process byproducts to the inner wall of the exhaust pipe 50. Therefore, the transport capacity of the exhaust pipe 50 can be maximized and a maintenance cycle can be remarkably lengthened, thereby implementing an exhaust system having a high effective operating rate.

Figure 5:
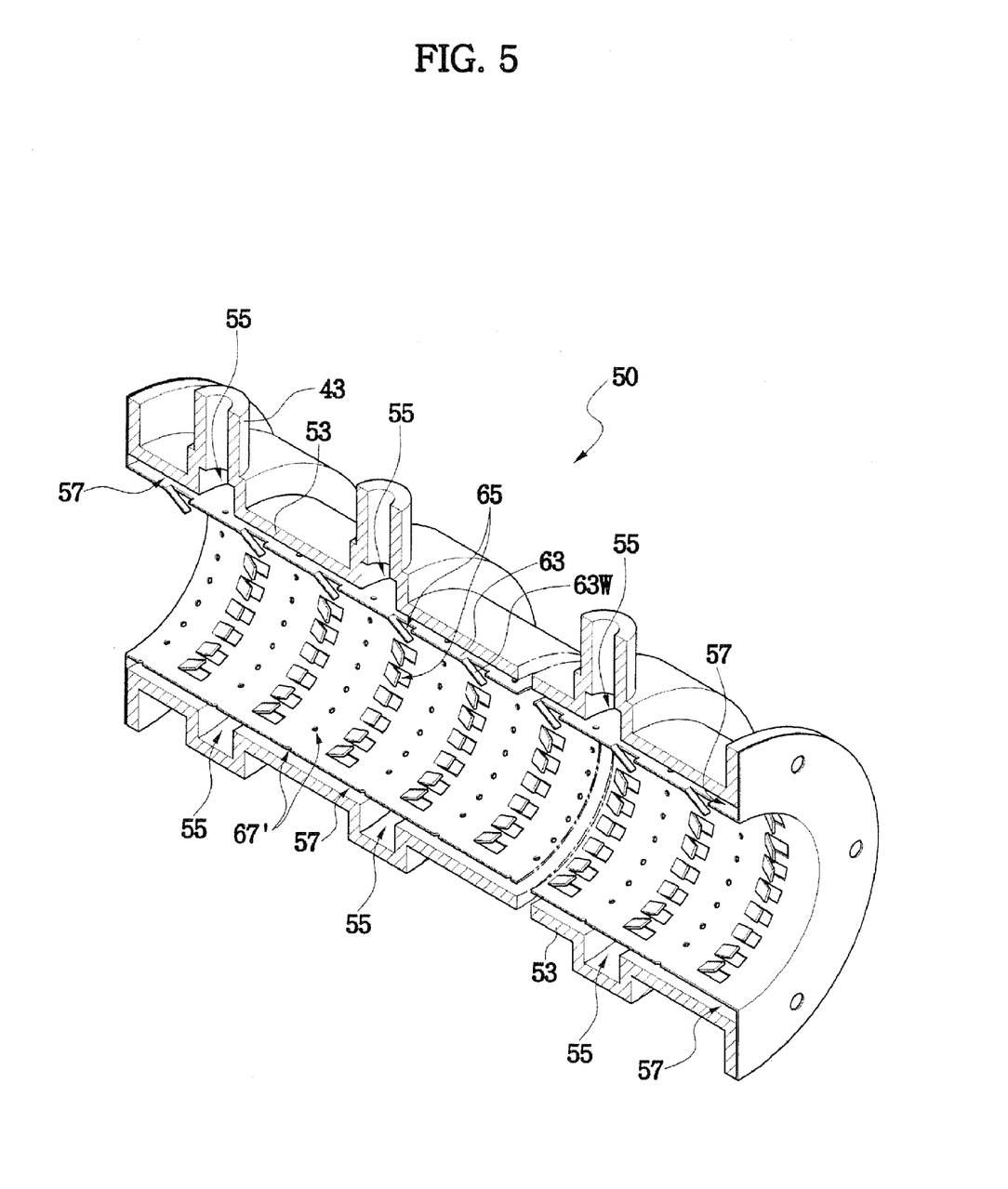
FIGS. 5 to 7 are partial perspective views of an exhaust pipe having turbulence wings in accordance with other exemplary embodiments of the present invention.

FIG. 5 is a perspective view of an exhaust pipe having turbulence wings in accordance with a second exemplary embodiment of the present invention.

Referring to FIGS. 1 and 5, the exhaust pipe 50 in accordance with a second exemplary embodiment of the present invention may include an outer pipe 53, and an inner pipe 63 installed in the outer pipe 53. A gap 57 may be disposed between the outer pipe 53 and the inner pipe 63. A gas inlet port 55 may be disposed to pass through a sidewall of the outer pipe 53. The outer pipe 53 may be connected to gas supply pipes 43. The gas inlet port 55 may be in communication with the gas supply pipe 43. The inner pipe 63 may include the turbulence wings 63W.

The inner pipe 63 may include first gas discharge ports 65 and second gas discharge ports 67'. The first gas discharge ports 65 may be disposed along an inner periphery of the inner pipe 63 in an annular shape. The second gas discharge ports 67' may also be disposed along the inner periphery of the inner pipe 63 in an annular shape. The first gas discharge ports 65 and the second gas discharge ports 67' may be alternately disposed about a longitudinal axial direction of the exhaust pipe 50—that is, first and second gas discharge ports 65, 67' may be linearly offset from one another. The first gas discharge ports 65 and the second gas discharge ports 67' may be in communication with the gas supply pipe 43 via the gap 57 and the gas inlet port 55.

Figure 6:
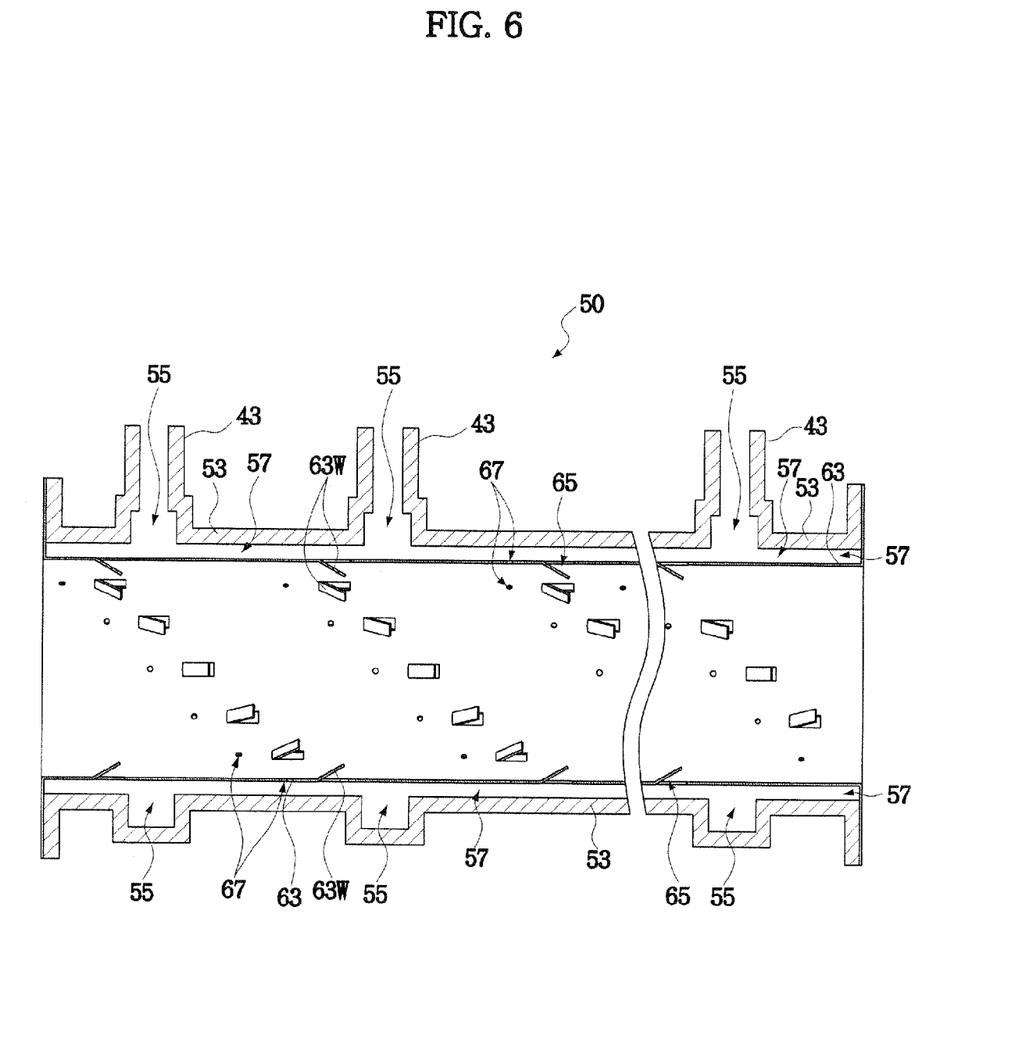

FIG. 6 is a partial perspective view of an exhaust pipe having turbulence wings in accordance with a third exemplary embodiment of the present invention.

Referring to FIGS. 1 and 6, the exhaust pipe 50 in accordance with a third exemplary embodiment of the present invention may include an outer pipe 53, and an inner pipe 63 installed in the outer pipe 53. A gap 57 may be disposed between the outer pipe 53 and the inner pipe 63. A gas inlet port 55 may be disposed to pass through a sidewall of the outer pipe 53. The outer pipe 53 may be connected to gas supply pipes 43. The gas inlet port 55 may be in communication with the gas supply pipe 43. The inner pipe 63 may include the turbulence wings 63W.

The inner pipe 63 may include first gas discharge ports 65 and second gas discharge ports 67. The first gas discharge ports 65 may be disposed along an inner periphery of the inner pipe 63 in a spiral shape. The second gas discharge ports 67 may also be disposed along the inner periphery of the inner pipe 63 in a spiral shape. The first gas discharge ports 65 and the second gas discharge ports 67 may be disposed in a line. The first gas discharge ports 65 and the second gas discharge ports 67 may be in communication with the gas supply pipe 43 via the gap 57 and the gas inlet port 55.

The turbulence wings 63W may be disposed to project inward from the inner pipe 63 at an oblique angle with respect to an inside surface of the inner pipe. The turbulence wings 63W may be disposed adjacent to the first gas discharge ports 65. When the first gas discharge ports 65 are arranged spirally along the inner periphery of the inner pipe 63, the turbulence wings 63W may also be arranged spirally along the inner periphery of the inner pipe 63.

The spirally arranged turbulence wings 63W, the first gas discharge ports 65, and the second gas discharge ports 67 may contribute a vortex-shaped jet layer. The vortex-shaped jet layer may function to make a moving speed of the process byproducts and the residual gases relatively fast. The vortex-shaped jet layer may function to effectively prevent the process byproducts and the residual gases from coming in contact with the inner wall of the exhaust pipe 50.

Figure 7:
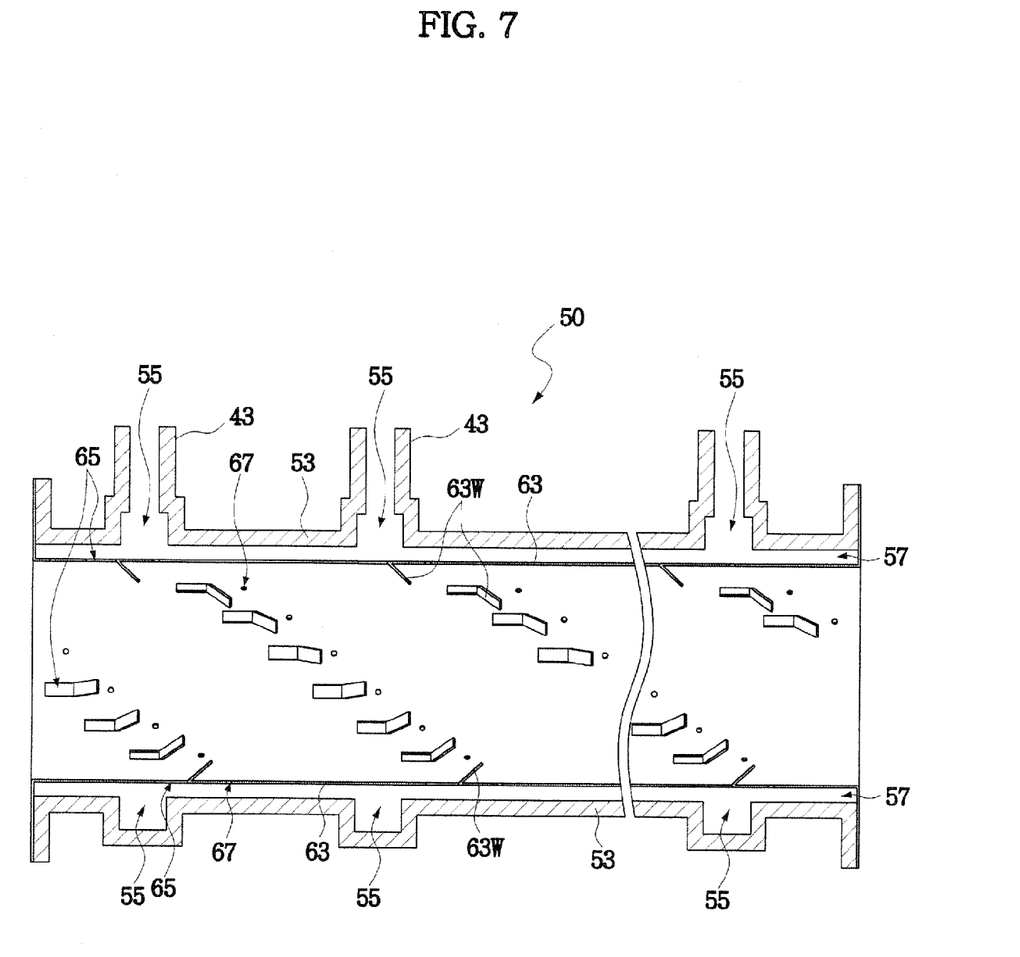

FIG. 7 is a partial perspective view of an exhaust pipe having turbulence wings in accordance with a fourth exemplary embodiment of the present invention.

Referring to FIGS. 1 and 7, the exhaust pipe 50 in accordance with a fourth exemplary embodiment of the present invention may include an outer pipe 53, and an inner pipe 63 installed in the outer pipe 53. A gap 57 may be disposed between the outer pipe 53 and the inner pipe 63. A gas inlet port 55 may be disposed to pass through a sidewall of the outer pipe 53. The outer pipe 53 may be connected to gas supply pipes 43. The gas inlet port 55 may be in communication with the gas supply pipe 43. The inner pipe 63 may include the turbulence wings 63W.

The inner pipe 63 may include first gas discharge ports 65 and second gas discharge ports 67. The first gas discharge ports 65 may be disposed along an inner periphery of the inner pipe 63 in a spiral shape. The second gas discharge ports 67 may also be disposed along the inner periphery of the inner pipe 63 in a spiral shape. The second gas discharge ports 67 may be straightly disposed behind the first gas discharge ports 65. The first gas discharge ports 65 and the second gas discharge ports 67 may be in communication with the gas supply pipe 43 via the gap 57 and the gas inlet port 55.

The turbulence wings 63W may be disposed to project inward from the inner pipe 63. The turbulence wings 63W may be disposed adjacent to the first gas discharge ports 65. The turbulence wings 63W may be disposed at an outlet side of an exhaust gas passage about the first gas discharge port 65. When the first gas discharge ports 65 are arranged spirally along the inner periphery of the inner pipe 63, the turbulence wings 63W may also be arranged spirally along the inner periphery of the inner pipe 63. That is, the turbulence wings 63W may be inclinedly disposed at an oblique angle with respect to the inner periphery of the inner pipe 63.

Figure 8:
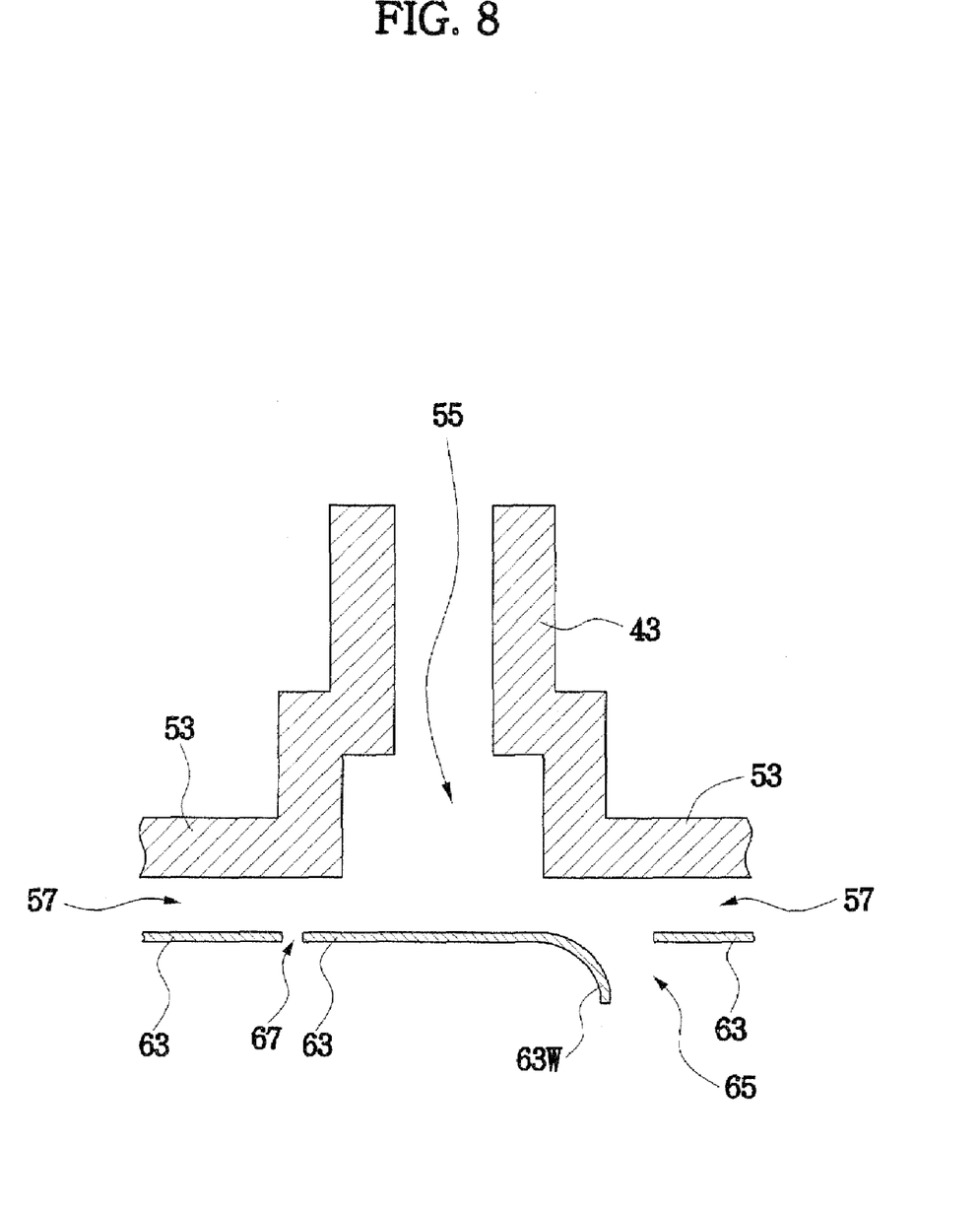
FIGS. 8 to 10 are partially enlarged cross-sectional views of an exhaust pipe having turbulence wings in accordance with still other exemplary embodiments of the present invention.

FIG. 8 is a partially enlarged cross-sectional view of an exhaust pipe having turbulence wings in accordance with a fifth exemplary embodiment of the present invention.

Referring to FIG. 8, the exhaust pipe in accordance with a fifth exemplary embodiment of the present invention may include an outer pipe 53, and an inner pipe 63 installed in the outer pipe 53. A gap 57 may be disposed between the outer pipe 53 and the inner pipe 63. A gas inlet port 55 may be disposed through a sidewall of the outer pipe 53. The outer pipe 53 may be connected to a gas supply pipe 43. The gas inlet port 55 may be in communication with the gas supply pipe 43. The inner pipe 63 may include the turbulence wings 63W.

The turbulence wings 63W may be disposed at various angles and in various shapes with respect to the inner pipe 63. As shown in FIG. 8, the turbulence wings 63W may be formed by a bending process to form arcuate surfaces over which the inert gas flows to form a turbulence sufficient to contribute to a jet layer 71. The arcuate surface is preferably convex from an upstream side of the first gas discharge port 65. The turbulence wings 63W may be formed by a sheet metal forming process.

Figure 9:
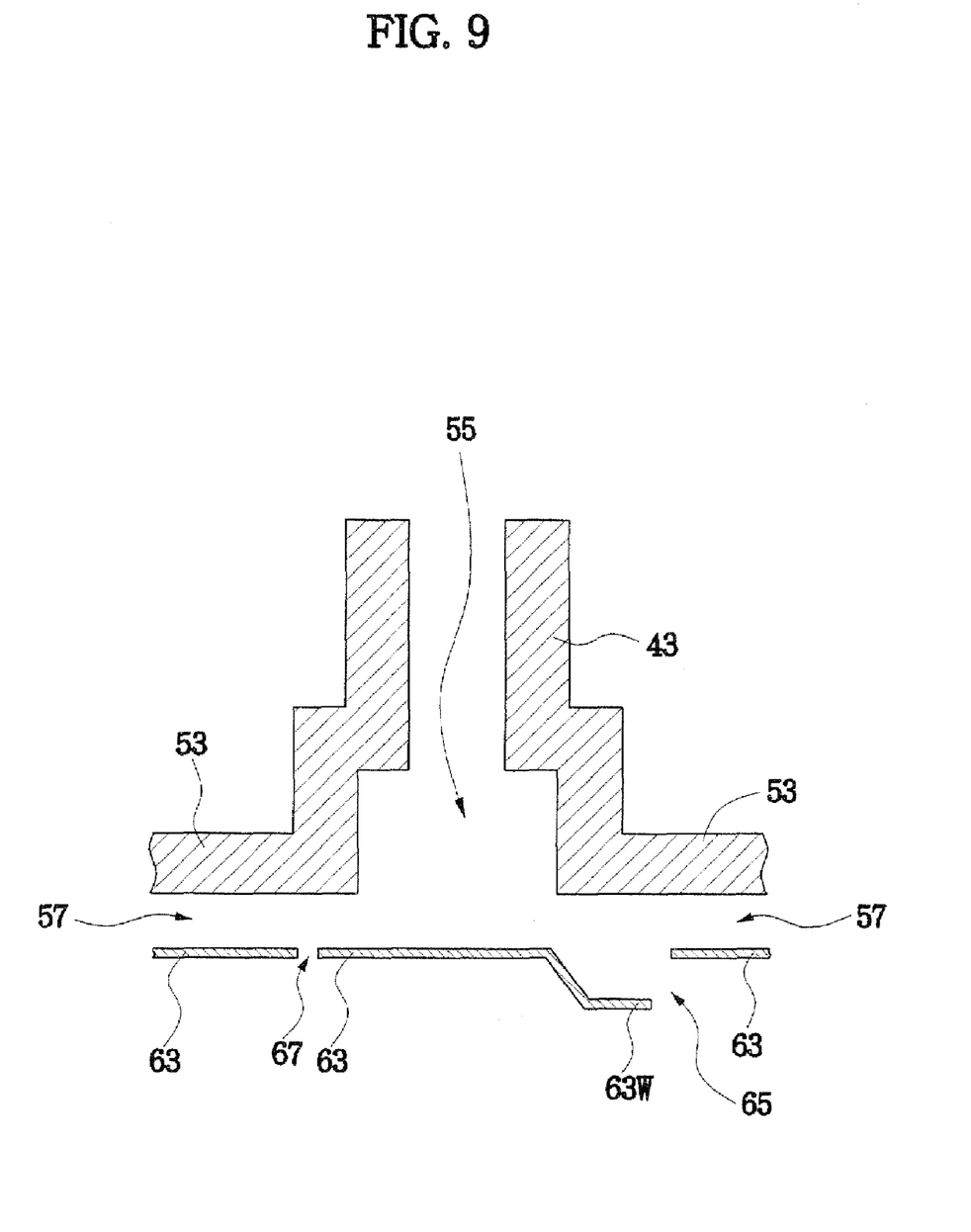

FIG. 9 is a partially enlarged cross-sectional view of an exhaust pipe having turbulence wings in accordance with a sixth exemplary embodiment of the present invention.

Referring to FIG. 9, the exhaust pipe in accordance with a sixth exemplary embodiment of the present invention may include an outer pipe 53, and an inner pipe 63 installed in the outer pipe 53. A gap 57 may be disposed between the outer pipe 53 and the inner pipe 63. A gas inlet port 55 may be disposed through a sidewall of the outer pipe 53. The outer pipe 53 may be connected to a gas supply pipe 43. The gas inlet port 55 may be in communication with the gas supply pipe 43. The inner pipe 63 may include the turbulence wings 63W.

The turbulence wings 63W may be disposed at various angles and in various shapes with respect to the inner pipe 63. As shown in FIG. 9, the turbulence wings 63W may be formed to have a double-bent shape. In the preferred embodiment shown, the double-bent shape has a downwardly inclined portion leading from an upstream edge of the first gas discharge port 65 into the interior of the inner pipe 63. The incline portion is coupled or integrally formed with a terminal portion extending substantially parallel to the sidewalls of the inner pipe 63. The turbulence wings 63W may be formed by a sheet metal forming process. Further, the turbulence wings 63W may have a multi-bent shape with more than two portions apiece.

Figure 10:
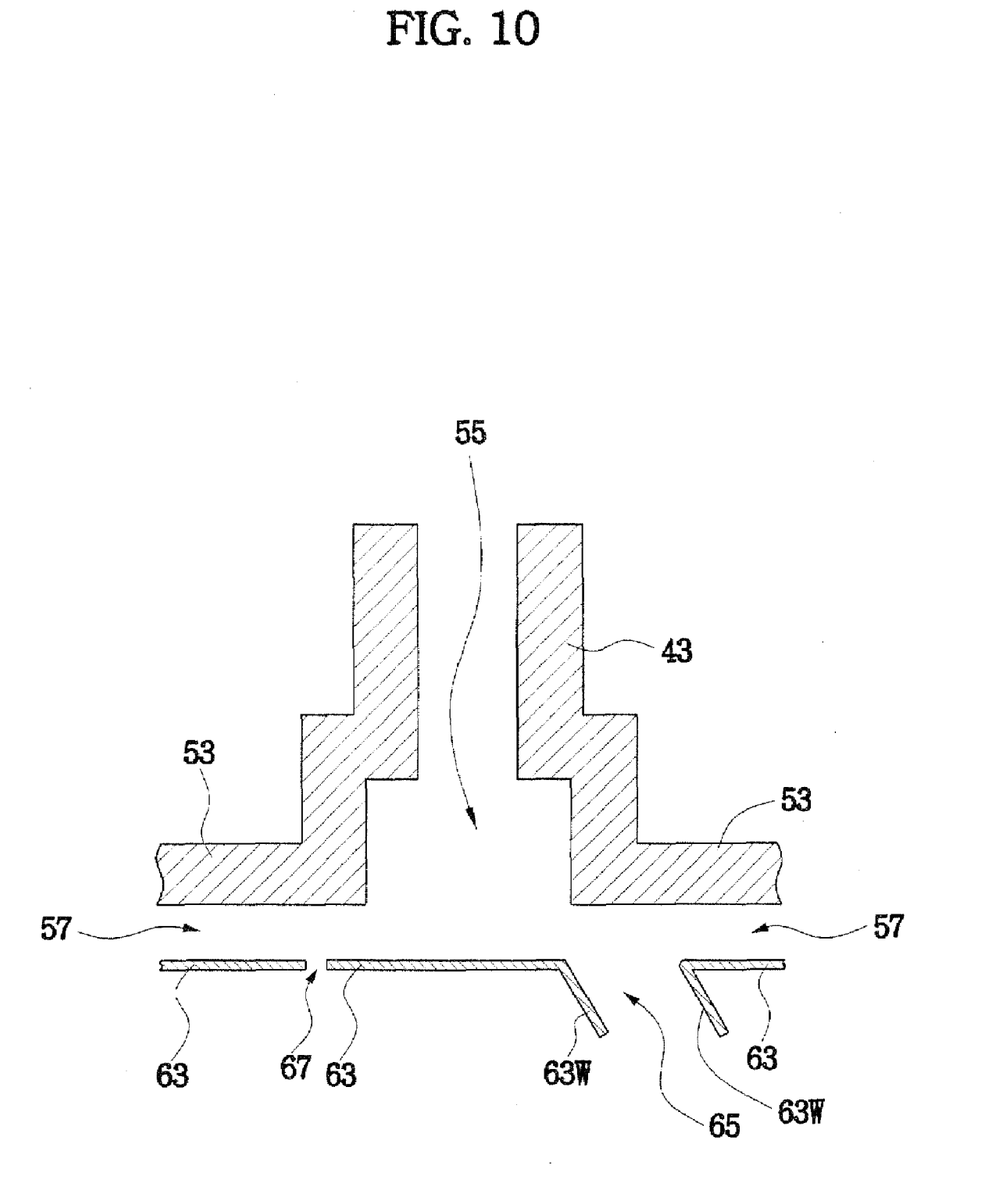

FIG. 10 is a partially enlarged cross-sectional view of an exhaust pipe having turbulence wings in accordance with a seventh exemplary embodiment of the present invention.

Referring to FIG. 10, the exhaust pipe in accordance with a seventh exemplary embodiment of the present invention may include an outer pipe 53, and an inner pipe 63 installed in the outer pipe 53. A gap 57 may be disposed between the outer pipe 53 and the inner pipe 63. A gas inlet port 55 may be disposed through a sidewall of the outer pipe 53. The outer pipe 53 may be connected to a gas supply pipe 43. The gas inlet port 55 may be in communication with the gas supply pipe 43. The inner pipe 63 may include the turbulence wings 63W.

The inner pipe 63 may include a first gas discharge port 65 and a second gas discharge port 67. The turbulence wings 63W may be disposed at both sides of the first gas discharge port 65. In this case, the turbulence wings 63W may be disposed at inlet and outlet sides of an exhaust gas passage about the first gas discharge port 65, respectively.

While the above embodiments describe the exhaust pipe 50 disposed between the vacuum pump 20 and the scrubber 30 of the exhaust system, it may be possible to dispose the exhaust pipe 50 at various places such as between the process chamber 10 and the vacuum pump 20.

As can be seen from the foregoing, the present invention is directed to an exhaust pipe including an outer pipe and an inner pipe. The inner pipe includes gas discharge ports. Turbulence wings adjacent to the gas discharge ports are disposed to project inward from the inner pipe. An inert gas injected from the gas discharge ports flows along an inner periphery of the inner pipe to form a jet layer. The turbulence wings can function to control thickness and distribution of the jet layer.

The exhaust pipe is disposed between a process chamber and a scrubber. Process byproducts produced in the process chamber can be transported to the scrubber through the exhaust pipe. In this process, the jet layer can function to prevent adsorption of the process byproducts to an inner wall of the exhaust pipe. Eventually, it is possible to implement an exhaust system capable of preventing adsorption of the process byproducts to the inner wall of the exhaust pipe.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An exhaust pipe, comprising:
   an inner pipe nested within an outer pipe with a gap formed therebetween and defining upstream and downstream portions thereof;
   a gas inlet port formed through a sidewall of the outer pipe adapted for introducing gases into the gap;
   a plurality of first gas discharge ports formed through a sidewall of the inner pipe adapted for introducing gases from the gap into an interior of the inner pipe; and
   turbulence wings projecting into the interior of the inner pipe.

2. The exhaust pipe of claim 1, wherein the turbulence wings are spaced apart from each other and arranged spirally along an inner periphery of the inner pipe.

3. The exhaust pipe of claim 1, wherein the turbulence wings are spaced apart from each other and arranged annularly along an inner periphery of the inner pipe.

4. The exhaust pipe of claim 1, further including a plurality of second gas discharge ports formed through the sidewall of the inner pipe in spaced apart fashion from the first gas discharge ports, the turbulence wings being adjacent only to the first gas discharge ports.

5. The exhaust pipe of claim 4, wherein the second gas discharge ports are linearly aligned along a length of the inner pipe with the first gas discharge ports.

6. The exhaust pipe of claim 4, wherein the second gas discharge ports are offset from the first gas discharge ports along a length of the inner pipe.

7. The exhaust pipe of claim 4, wherein the first and second gas discharge ports are arranged in respective parallel lines arranged spirally along an inner periphery of the inner pipe.

8. The exhaust pipe of claim 7, wherein the second gas discharge ports are disposed upstream of a closest adjacent line of first gas discharge ports.

9. The exhaust pipe of claim 7, wherein the second gas discharge ports are disposed downstream of a closest adjacent line of first gas discharge ports.

10. The exhaust pipe of claim 1, wherein each of the turbulence wings is disposed adjacent an upstream edge of a respective first gas discharge port.

11. The exhaust pipe of claim 1, wherein each of the turbulence wings is disposed adjacent a downstream edge of a respective First gas discharge port.

12. The exhaust pipe of claim 1, wherein the turbulence wings are disposed adjacent both upstream and downstream edges of each of the plurality of first gas discharge ports.

13. The exhaust pipe of claim 1, wherein an angle of intersection between the turbulence wings and the inner pipe ranges from 1 to 179°.

14. The exhaust pipe of claim 1, the turbulence wings being inclinedly disposed with respect to an inner periphery of the inner pipe.

15. The exhaust pipe of claim 14, wherein the turbulence wings include arcuate projections into the interior of the inner pipe.

16. The exhaust pipe of claim 14, wherein the turbulence wings include double-bent projections into the interior of the inner pipe.

17. The exhaust pipe of claim 1, wherein the inner pipe has a thinner sidewall than the outer pipe.

18. An exhaust system, comprising:
   a process chamber;
   a scrubber;
   an exhaust pipe coupled between the process chamber and scrubber, said exhaust pipe having turbulence wings projecting into an interior of the exhaust pipe; and
   an inert gas source coupled to the exhaust pipe for flow of the inert gas over the turbulence wings to create a jet layer adjacent an inner surface of the exhaust pipe and defining an exhaust gas passage through the exhaust pipe from the process chamber to the scrubber.

19. The exhaust system of claim 18, the exhaust pipe including an inner pipe nested within an outer pipe with a gap formed therebetween, a gas inlet port coupled to the inert gas source formed through a sidewall of the outer pipe and a plurality of first gas discharge ports defined along a length of the inner pipe and formed through a sidewall of the inner pipe adjacent the turbulence wings.

20. The exhaust system of claim 19, wherein the sidewall of the inner pipe is thinner than the sidewall of the outer pipe.

21. The exhaust system according to claim 19, wherein the turbulence wings have the same thickness as the inner pipe.

22. The exhaust system of claim 19, the exhaust pipe further including a plurality of second gas discharge ports defined along the length of the inner pipe and not adjacent the turbulence wings.

23. The exhaust system of claim 18, further including a heater for heating the inert gas prior to entering the exhaust pipe.

24. The exhaust system of claim 23, said heater being adapted to heat the inert gas to a temperature that is greater than a phase transition temperature of the exhaust gas.

25. The exhaust system according to claim 19, further comprising a vacuum pump disposed between the process chamber and the outer pipe.

26. A method for exhausting gases from a process chamber comprising:
   coupling an exhaust pipe to the process chamber, the exhaust pipe having turbulence wings projecting into an interior of the exhaust pipe;
   flowing an inert gas over the turbulence wings so as to create a jet layer adjacent an inner surface of the exhaust pipe; and
   exhausting gases from the process chamber through an exhaust passage formed in the exhaust pipe, the exhaust passage being spaced from the inner surface of the exhaust pipe by the jet layer.

27. The method of claim 26, the exhaust pipe including an inner pipe nested within an outer pipe with a gap formed therebetween, a gas inlet port formed through a sidewall of the outer pipe and a plurality of first gas discharge ports defined along a length of the inner pipe and formed through a sidewall of the inner pipe adjacent the turbulence wings, the method further including introducing the inert gas into the interior of the inner pipe through the gas inlet port and first gas discharge ports.

28. The method of claim 27, the exhaust pipe further including a plurality of second gas discharge ports defined along the length of the inner pipe and not adjacent the turbulence wings, the method further including introducing the inert gas into the interior of the inner pipe through the second gas discharge ports so as to contribute to the creation of the jet layer adjacent the inner surface of the exhaust pipe.

29. The method of claim 26, further including the step of heating the inert gas prior to introducing the inert gas to the exhaust pipe.

30. The method of claim 29, wherein the step of heating the inert gas including heating the inert gas to a temperature of between about 20~300° C. so as to prevent the gases exhausted from the process chamber from undergoing a phase transformation.

* * * * *